US008718142B2

(12) United States Patent
Riemens et al.

(10) Patent No.: US 8,718,142 B2
(45) Date of Patent: May 6, 2014

(54) SYSTEM AND METHOD FOR FRAME RATE CONVERSION THAT UTILIZES MOTION ESTIMATION AND MOTION COMPENSATED TEMPORAL INTERPOLATION EMPLOYING EMBEDDED VIDEO COMPRESSION

(75) Inventors: Abraham Karel Riemens, Eersel (NL); Onno Eerenberg, Oisterwijk (NL); Thijs Thomas Withaar, Eindhoven (NL); Timo Van Roermund, Eindhoven (NL)

(73) Assignee: Entropic Communications, Inc., San Diego, CA (US)

( * ) Notice: Subject to any disclaimer, the term of this patent is extended or adjusted under 35 U.S.C. 154(b) by 942 days.

(21) Appl. No.: 12/398,042

(22) Filed: Mar. 4, 2009

(65) Prior Publication Data

US 2010/0226435 A1    Sep. 9, 2010

(51) Int. Cl.
*H04B 1/66*    (2006.01)
*G06K 9/36*    (2006.01)

(52) U.S. Cl.
USPC ..................... 375/240.16; 382/236

(58) Field of Classification Search
USPC .......... 382/236, 251, 233, 232, 243; 348/390, 348/699, 416, 420, 400; 375/240.01–240.26
See application file for complete search history.

(56) References Cited

U.S. PATENT DOCUMENTS

| | | | | |
|---|---|---|---|---|
| 5,835,691 | A * | 11/1998 | Matsunoshita | 358/1.17 |
| 2002/0001411 | A1 * | 1/2002 | Suzuki et al. | 382/238 |
| 2002/0031272 | A1 * | 3/2002 | Bagni et al. | 382/236 |
| 2003/0086498 | A1 | 5/2003 | Lee et al. | |
| 2005/0243926 | A1 * | 11/2005 | Hubrich et al. | 375/240.16 |
| 2006/0159175 | A1 * | 7/2006 | De Haan | 375/240.16 |
| 2006/0274955 | A1 * | 12/2006 | Honda et al. | 382/236 |
| 2007/0081096 | A1 * | 4/2007 | Klein Gunnewiek et al. | 348/416.1 |
| 2007/0230578 | A1 * | 10/2007 | Shi et al. | 375/240.16 |
| 2007/0268965 | A1 | 11/2007 | Alfonso et al. | |
| 2008/0304568 | A1 | 12/2008 | Chang | |
| 2010/0110304 | A1 * | 5/2010 | Chen | 348/701 |
| 2010/0266041 | A1 * | 10/2010 | Gish et al. | 375/240.15 |

FOREIGN PATENT DOCUMENTS

WO    2004092960 A2    10/2004
WO    2007135602 A1    11/2007

OTHER PUBLICATIONS

Gerard De Haan, Paul W.A.C. Biezen, Henk Huijgen, and Olukayode A. Ojo; True-Motion Estimation with 3-D Recursive Search Block Matching; IEEE Transactions on Circuits and Systems for Video Technology; Oct. 1993; vol. 3, No. 5; p. 368-388.
A.K. Riemens, R.J. Van Der Vleuten, P. Van Der Wolf, G. Jacob, J.W. Van De Waerdt, J.G. Janssen; Transparent Embedded Compression in Systems-on-Chip; Proceedings of the IEEE Workshop on Signal Processing Systems; Banff AB, Canada; Oct. 2-4, 2006; p. 277-282.

(Continued)

*Primary Examiner* — Behrooz Senfi
(74) *Attorney, Agent, or Firm* — Richard Bachand; Duane Morris LLP

(57) ABSTRACT

A technique for frame rate conversion that utilizes motion estimation and motion compensated temporal interpolation includes obtaining a first image and a second image, where the first and second images correspond to different instances in time, compressing the second image using multiple motion vectors that result from motion estimation between the first image and the second image to generate a compressed image, and generating an interpolated image using the compressed image.

19 Claims, 15 Drawing Sheets

(56) References Cited

OTHER PUBLICATIONS

CEI/IEC-61834; Helical-scan digital video cassette recording system using 6,35 mm magnetic tape for consumer use (525-60, 625-50, 1125-60 and 1250-50 systems); 1998+A1; 2001.

International Search Report for PCT/us2010/026270 mailed Sep. 29, 2010.

Written Opinion of the International Searching Authority for PCT/us2010/026270 mailed Sep. 29, 2010.

* cited by examiner

| IMAGE DATA | STANDARD HD PROGRESSIVE |
|---|---|
| WIDTH | 1920 |
| HEIGHT | 1080 |
| FORMAT | 1 Y ONLY; 8 BITS |
| IMAGE SIZE | 2073600 BYTES |

FIG. 6

| BLOCK | RATE [Hz] | INPUT [IMAGES] | INPUT [VECTOR] | INPUT [BYTES] | OUTPUT [IMAGES] | OUTPUT [VECTOR] | OUTPUT [BYTES] | BW [MBYTES/S] |
|---|---|---|---|---|---|---|---|---|
| 1st ME | 24 | 2 | 1 | 4276800 | 0.125 | 1 | 388800 | 112 |
| 2nd ME | 24 | 1.125 | 1 | 2462400 | 0.125 | 1 | 388800 | 68 |
| MCTI | 24 | 1.125 | 1 | 2462400 | 4 | | 8294400 | 258 |
| OUT | 120 | 1 | | 2073600 | | | 0 | 249 |
| TOTAL | | | | | | | | 687 |

ME: MOTION ESTIMATOR
MCTI: MOTION COMPENSATED TEMPORAL INTERPOLATOR
OUT: VIDEO OUTPUT PROCESSING UNIT

FIG. 7

| BLOCK | RATE [Hz] | INPUT [IMAGES] | INPUT [VECTOR] | INPUT [BYTES] | OUTPUT [IMAGES] | OUTPUT [VECTOR] | OUTPUT [BYTES] | BW [MBYTES/S] |
|---|---|---|---|---|---|---|---|---|
| 1st ME | 24 | 2 | 1 | 4276800 | 0.125 | 1 | 388800 | 112 |
| 2nd ME | 24 | 1.125 | 1 | 2462400 | 0.125 | 1 | 388800 | 68 |
| MCTI | 96 | 1.125 | 1 | 2462400 | | | 0 | 236 |
| OUT | 24 | 1 | | 2073600 | | | 0 | 50 |
| TOTAL | | | | | | | | 467 |

ME: MOTION ESTIMATOR
MCTI: MOTION COMPENSATED TEMPORAL INTERPOLATOR
OUT: VIDEO OUTPUT PROCESSING UNIT

FIG. 9

| BLOCK | RATE [Hz] | INPUT [IMAGES] | INPUT [VECTOR] | INPUT [BYTES] | OUTPUT [IMAGES] | OUTPUT [VECTOR] | OUTPUT [BYTES] | BW [MBYTES/S] |
|---|---|---|---|---|---|---|---|---|
| 1st ME | 24 | 2 | 1 | 4276800 | | 1 | 129600 | 106 |
| 2nd ME | 24 | 1 | 1 | 2203200 | | 1 | 129600 | 56 |
| MCTI | 96 | 1 | 1 | 2203200 | | | 0 | 212 |
| OUT | 24 | 1 | | 2073600 | | | 0 | 50 |
| TOTAL | | | | | | | | 423 |

ME: MOTION ESTIMATOR
MCTI: MOTION COMPENSATED TEMPORAL INTERPOLATOR
OUT: VIDEO OUTPUT PROCESSING UNIT

FIG. 11

| BLOCK | RATE [Hz] | INPUT [IMAGES] | INPUT [VECTOR] | INPUT [BYTES] | OUTPUT [IMAGES] | OUTPUT [VECTOR] | OUTPUT [BYTES] | BW [MBYTES/S] |
|---|---|---|---|---|---|---|---|---|
| 1st ME | 24 | 1.333 | 1 | 2894400 | | 1 | 129600 | 73 |
| 2nd ME | 24 | 0.667 | 1 | 1512000 | | 1 | 129600 | 39 |
| MCTI | 96 | 0.667 | 1 | 1512000 | | | 0 | 145 |
| OUT | 24 | 1 | | 2073600 | | | 0 | 50 |
| TOTAL | | | | | | | | 307 |

ME: MOTION ESTIMATOR
MCTI: MOTION COMPENSATED TEMPORAL INTERPOLATOR
OUT: VIDEO OUTPUT PROCESSING UNIT

FIG. 13

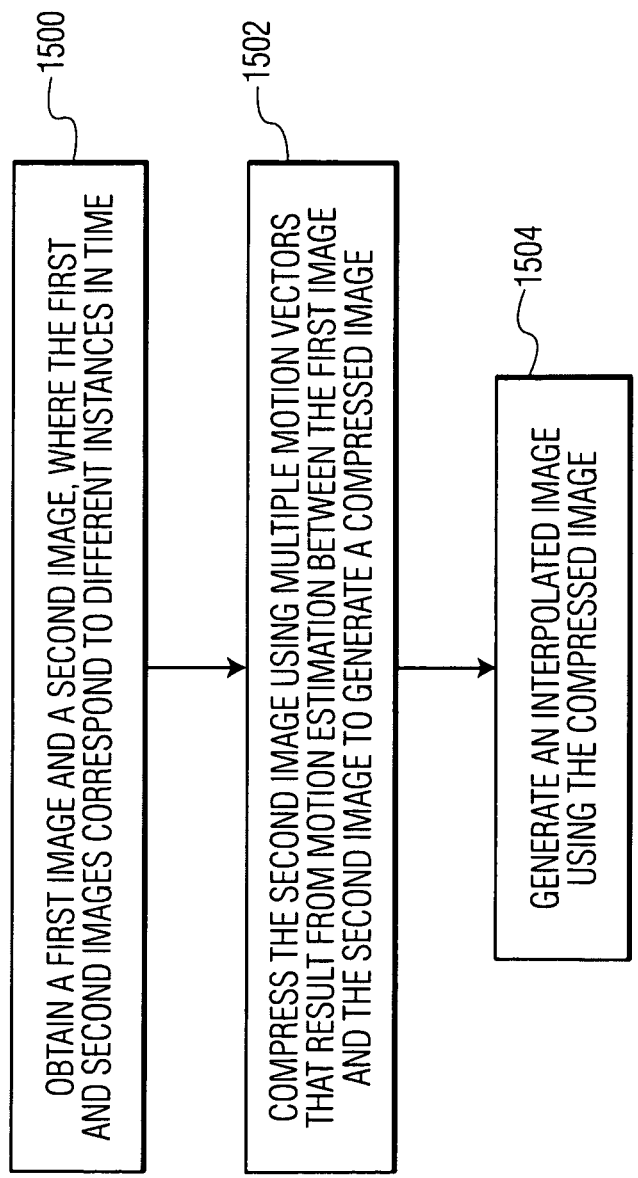

SYSTEM AND METHOD FOR FRAME RATE CONVERSION THAT UTILIZES MOTION ESTIMATION AND MOTION COMPENSATED TEMPORAL INTERPOLATION EMPLOYING EMBEDDED VIDEO COMPRESSION

Embodiments of the invention relate generally to video processing systems and methods and, more particularly, to a system and method for frame rate conversion that utilizes motion estimation and motion compensated temporal interpolation employing embedded video compression.

A concern with frame rate conversion systems is substantial memory bandwidth consumption and amount of memory that is used to store images, which can lead to high component costs. Thus, there is a need for a system and method for frame rate conversion that can reduce the memory bandwidth consumption and the amount of memory that is used to store images.

A technique for frame rate conversion that utilizes motion estimation and motion compensated temporal interpolation includes obtaining a first image and a second image, where the first and second images correspond to different instances in time, compressing the second image using multiple motion vectors that result from motion estimation between the first image and the second image to generate a compressed image, and generating an interpolated image using the compressed image. By using the motion vectors that result from motion estimation between the first image and the second image to perform compression, image accesses and amount of memory that is used to store images are reduced, which results in bandwidth consumption savings and image memory storage size savings.

In an embodiment, a method for frame rate conversion that utilizes motion estimation and motion compensated temporal interpolation involves obtaining a first image and a second image, where the first and second images correspond to different instances in time, compressing the second image using multiple motion vectors that result from motion estimation between the first image and the second image to generate a compressed image, and generating an interpolated image using the compressed image.

In an embodiment, a system for frame rate conversion that utilizes motion estimation and motion compensated temporal interpolation includes a compression unit. The compression unit is configured to compress a second image using multiple motion vectors that result from motion estimation between a first image and the second image to generate a compressed image, where the first and second images correspond to different instances in time. The system is configured to generate an interpolated image using the compressed image.

In an embodiment, a system for frame rate conversion includes a motion estimator and a motion compensated temporal interpolator. The motion estimator is configured to perform motion estimation between a first image and a second image to generate multiple motion vectors and to compress the second image using the multiple motion vectors to generate a compressed image, where the first and second images correspond to different instances in time. The motion compensated temporal interpolator is configured to decompress the compressed image using the multiple motion vectors to reconstruct the second image and to perform motion compensated temporal interpolation on the first and second images to generate an interpolated image.

Other aspects and advantages of embodiments of the present invention will become apparent from the following detailed description, taken in conjunction with the accompanying drawings, depicted by way of example of the principles of the invention.

FIG. 6 shows some exemplary properties of input images for the frame rate conversion system of FIG. 2.

FIG. 7 shows a bandwidth consumption of the frame rate conversion system of FIG. 2.

FIG. 9 shows a bandwidth consumption of the frame rate conversion system of FIG. 8.

FIG. 11 shows a bandwidth consumption of the frame rate conversion system of FIG. 10.

FIG. 13 shows a bandwidth consumption of the frame rate conversion system of FIG. 12.

FIG. 15 is a process flow diagram of a method for frame rate conversion that utilizes motion estimation and motion compensated temporal interpolation in accordance with an embodiment of the invention.

Throughout the description, similar reference numbers may be used to identify similar elements.

Figure 1:
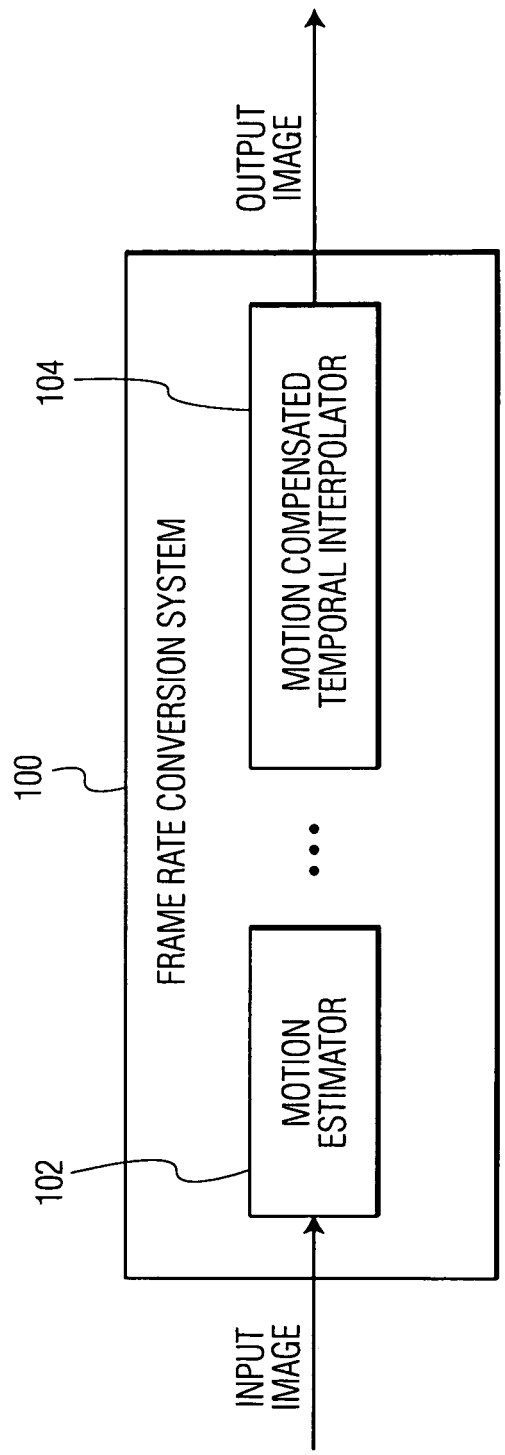
FIG. 1 is a schematic block diagram of a frame rate conversion system that utilizes motion estimation and motion compensated temporal interpolation in accordance with an embodiment of the invention.

FIG. 1 is a schematic block diagram of a frame rate conversion system 100 that utilizes motion estimation and motion compensated temporal interpolation in accordance with an embodiment of the invention. As shown in FIG. 1, the frame rate conversion system includes at least one motion estimator 102 and a motion compensated temporal interpolator 104. The system of FIG. 1 can be implemented in, for example, video processing servers, Televisions (TV), set-top boxes, Digital Versatile/Video Disc (DVD) players, and Blu-ray Disk players.

In the embodiment of FIG. 1, each motion estimator 102 is configured to perform motion estimation on input images to generate motion vectors according to a motion estimation algorithm and to compress one of the input images using the motion vectors to generate a compressed image. Each motion estimator may perform motion estimation on the input images according to a unique motion estimation algorithm. Using traditional motion estimation technique, a separate motion estimator finds the best predictor, i.e. the best match motion vector of each individual group of pixels, which leads to minimal residual data after compression. However, the criteria for motion vector selection for each motion estimator of FIG. 1 are determined by the best choice for scan rate conversion, aiming at the calculation of true motion vectors. Smoothness of the vector field and vector consistency is taken into account. Instead of using the best match motion vectors, each motion estimator uses the true motion vectors already calculated for frame rate conversion for compression. Compared to the best match motion vectors, the true motion vectors calculated for frame rate conversion are not optimal. That is, compared to the best match motion vectors, the true motion vectors calculated for frame rate conversion may generate larger residual data. However, compared to calculating a separate best match vector field for the compression, by using the true motion vectors calculated for frame rate conversion to perform compression, neither separate motion estimators for compression nor separate vector data storage are needed. Additionally, using the true motion vectors calculated for frame rate conversion to perform compression can lead to images access savings. The input images correspond to different instances in time. According to some motion estimation algorithms, each motion estimator performs motion estimation on two input images to generate motion vectors. For example, each motion estimator may perform motion estimation on a previous image and a current image to generate matching motion vectors. According to other motion estimation algorithms, each motion estimator performs motion estimation on more than two input images to generate motion vectors. For example, each motion estimator may perform motion estimation on a previous image, a current image, and a next image to generate matching motion vectors. As another example, each motion estimator may perform motion estimation on a pre-previous image, a previous image and a current image to generate matching motion vectors. A motion vector may refer to a sub-pixel position, for example, an image location at a quarter of pixel accuracy. In this case, a proper pixel interpolation, which may be a straightforward bilinear interpolation or a higher order interpolation, is carried out to obtain the pixel value at the sub-pixel position. Although multiple motion estimators are shown in FIG. 1, the frame rate conversion system 100 may include a single motion estimator. Multiple motion estimators can perform multiple iterations of motion estimation on the input images to improve the accuracy of motion vector field. A single motion estimator can serially perform multiple iterations of motion estimation on the input images to improve the accuracy of motion vector field. For example, the single motion estimator performs a first iteration of motion estimation on the input images first and then a second iteration of motion estimation on the input images.

The motion compensated temporal interpolator 104 is configured to decompress the compressed image using the motion vectors that result from motion estimation between the reference image and the selected image, to reconstruct the selected image, and to perform motion compensated temporal interpolation on the reference image and the reconstructed selected image to generate at least one interpolated image. The difference between the reconstructed selected image and the selected image is dependent on the compression technique and the decompression technique. When the compression technique and the decompression technique are lossless, the reconstructed selected image is essentially the same as the selected image. When the compression technique and the decompression technique are lossy, the reconstructed selected image may be somewhat different from the selected image. Compared to the lossless compression technique, the lossy compression technique can achieve a higher compression ratio.

In some embodiments, the frame rate conversion system 100 includes a spatial compression unit (not shown) and a spatial decompression unit (not shown). The spatial compression unit is configured to spatially compress at least one of the reference image and the selected image to generate a spatially compressed image. The spatial decompression unit is configured to spatially decompress the spatially compressed image to reconstruct the at least one of the reference image and the selected image. The difference between a reconstructed image and an original image is dependent on the spatial compression technique of the spatial compression unit and the decompression technique of the spatial decompression unit. When the compression technique of the spatial compression unit and the decompression technique of the spatial decompression unit are lossless, the reconstructed image is essentially the same as the original image. When the compression technique of the spatial compression unit and the decompression technique of the spatial decompression unit are lossy, the reconstructed image may be somewhat different from the original image. Compared to the lossless compression technique, the lossy compression technique can achieve a higher compression ratio. In some embodiments, there may be at least one buffer unit configured to buffer at least one of the reconstructed reference image and the reconstructed selected image.

Different embodiments of the frame rate conversion system 100 of FIG. 1 are described below with reference to FIGS. 2, 8, 10, 12, and 14.

Figure 2:
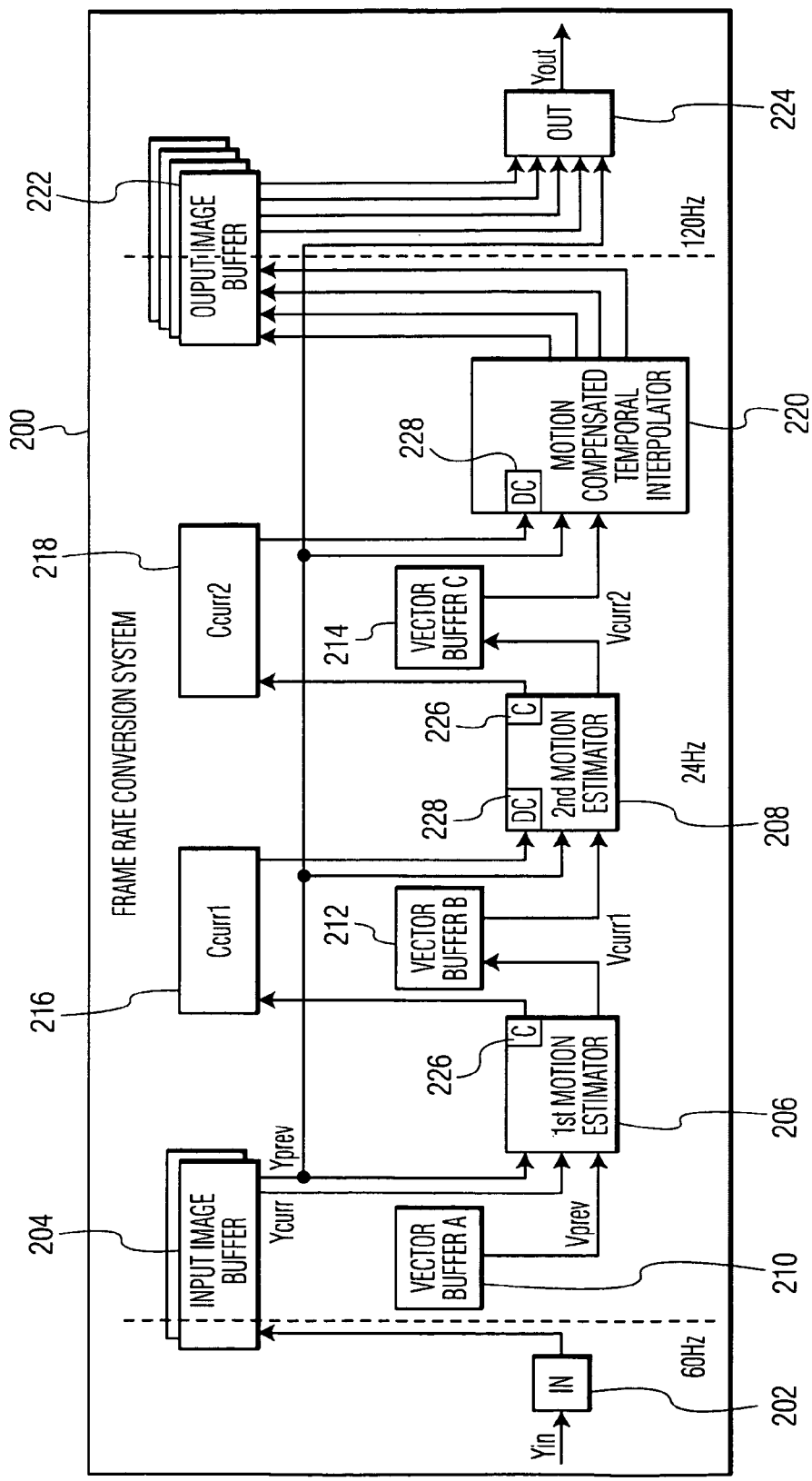
FIG. 2 depicts an embodiment of the frame rate conversion system of FIG. 1.

FIG. 2 depicts an embodiment of the frame rate conversion system 100 of FIG. 1. As shown in FIG. 2, the frame rate conversion system 200 includes a video input processing unit "IN" 202, an input image buffer 204, two motion estimators ($1^{st}$ motion estimator (ME) 206 and $2^{nd}$ motion estimator 208), three vector buffers (vector buffer A 210, vector buffer B 212, and vector buffer C 214), two compressed image buffers ("Ccurr1" 216 and "Ccurr2" 218), a motion compensated temporal interpolator (MCTI) 220, an output image buffer 222, and a video output processing unit "OUT" 224.

In the embodiment of FIG. 2, the video input processing unit "IN" 202 is configured to receive input video data, to process the received video data, and to transfer the processed input data to the input image buffer 204. For example, the video input processing unit "IN" may perform an initiation of Direct Memory Access (DMA) traffic to store the input video data into memory. As another example, the video input processing unit "IN" may recognize synchronization of the input video data, collect video lines from the input video data, and write the video lines into the memory. As another example, the video input processing unit "IN" may perform video decoding, such as Moving Picture Experts Group-2 (MPEG-2) decoding or H.264 decoding, on the input video data. The video input processing unit "IN" may be implemented in active logic circuits. In some embodiments, the video input processing unit "IN" is separated from the frame rate conversion system 200.

The input image buffer 204 is configured to buffer the received input data and to reconstruct images. The input image buffer may be a memory circuit.

Each of the $1^{st}$ and $2^{nd}$ motion estimators 206 and 208 is configured to perform motion estimation between a previous input image "Yprev" and a current input image "Ycurr" to generate motion vectors. The motion estimators then compress the current input image using the motion vectors to generate a compressed image. The $2^{nd}$ motion estimator is configured to reconstruct the current input image by decompressing the compressed image. In the embodiment of FIG. 2, the $2^{nd}$ motion estimator decompresses the compressed image using the motion vectors that result from motion estimation between the previous input image and the current input image. The $2^{nd}$ motion estimator is also configured to improve the motion vector field using motion estimation algorithms and to use the improved vector field for a subsequent image compression. In some embodiments, more than two motion estimators may be used, with each motion estimator being configured to improve the motion vector field from the previous motion estimator and to use the improved vector field for image compression. In some embodiments, there may be only one motion estimator that utilizes a single motion estimation algorithm. In some embodiments, each of the $1^{st}$ and $2^{nd}$ motion estimators is configured to compute multiple vector fields and to perform compression using one of the multiple vector fields. In some embodiments, the scanning order of the $1^{st}$ and $2^{nd}$ motion estimators may be selected independently. For example, the $1^{st}$ motion estimator may apply top to bottom scanning, while the $2^{nd}$ motion estimator applies bottom to top scanning. In the embodiment of FIG. 2, the compression and decompression operations are performed within the motion estimators by compression units "C" 226 and decompression units "DC" 228. Although two motion estimators are shown in FIG. 2, the frame rate conversion system 200 may include a single motion estimator. In this case, the single motion estimator serially performs two iterations of motion estimation on the input images.

Figure 3:
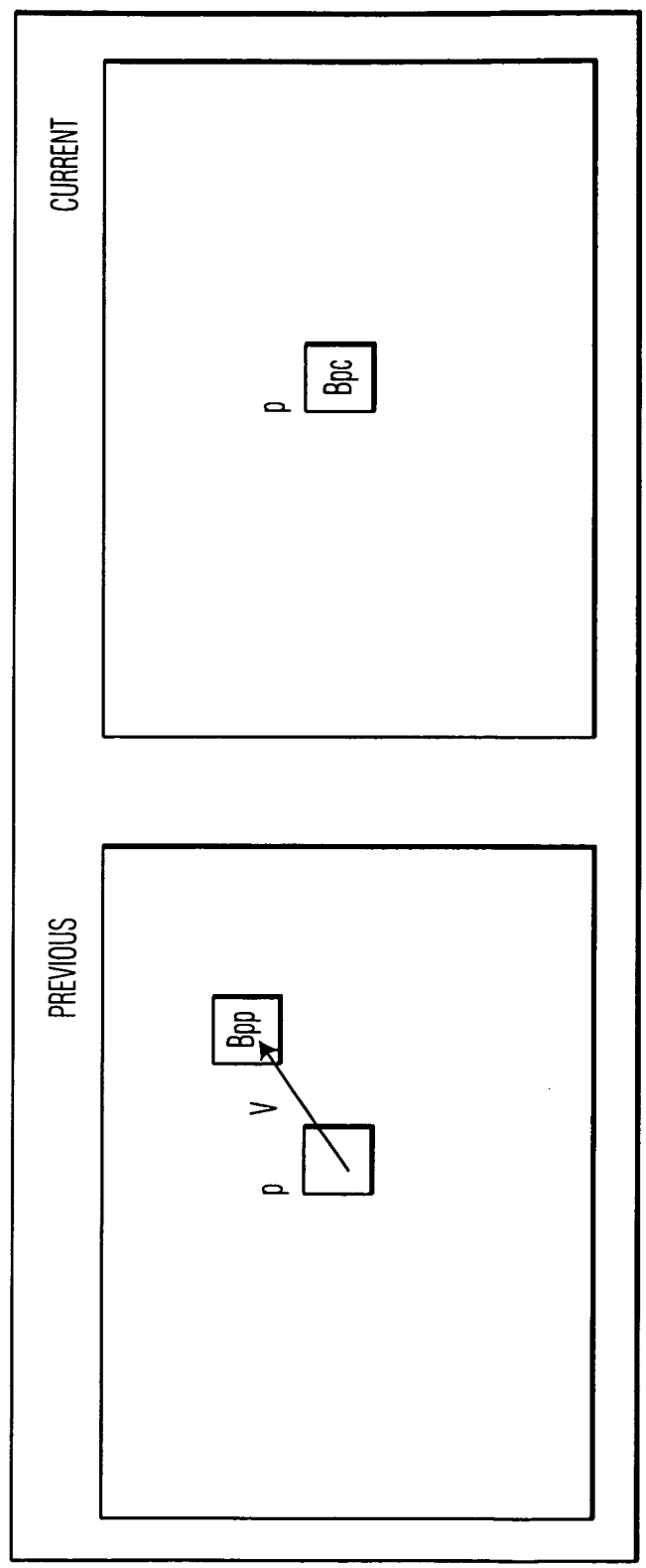
FIG. 3 illustrates an example of a temporal prediction process that is performed by the $1^{st}$ motion estimator and the $2^{nd}$ motion estimator of FIG. 2.

FIG. 3 illustrates an example of a temporal prediction process that is performed by the $1^{st}$ motion estimator 206 and the $2^{nd}$ motion estimator 208 of FIG. 2. As shown in FIG. 3, for a group of pixels "Bpc" of the current input image at position "p," a corresponding group of pixels "Bpp" of the previous input image is obtained using a motion vector "v" that results from motion estimation between the previous input image and the current input image. Residual data "Bres" is generated by subtracting the group of pixels "Bpp" of the previous input image from the group of pixels "Bpc" of the current input image, or by subtracting the group of pixels "Bpc" of the current input image from the group of pixels "Bpp" of the previous input image. The residual data "Bres" can be expressed as:

$$Bres = Bpc - Bpp \text{ or } Bres = Bpp - Bpc \quad (1)$$

For example, a group of four by four pixels "Bpc" and a group of four by four pixels "Bpp" may have the following values:

$$Bpp = \begin{bmatrix} 10 & 12 & 12 & 18 \\ 10 & 12 & 13 & 19 \\ 9 & 11 & 14 & 18 \\ 6 & 8 & 8 & 14 \end{bmatrix}$$

$$Bpc = \begin{bmatrix} 8 & 12 & 13 & 17 \\ 11 & 12 & 13 & 18 \\ 10 & 10 & 13 & 18 \\ 7 & 7 & 9 & 14 \end{bmatrix}$$

When Bres=Bpc−Bpp, the residual data "Bres" is:

$$Bres = \begin{bmatrix} -2 & 0 & 1 & -1 \\ 1 & 0 & 0 & -1 \\ 1 & -1 & -1 & 0 \\ 1 & -1 & 1 & 0 \end{bmatrix}$$

The range of the residual data "Bres" is substantially smaller than the range of the groups of pixels "Bpp" of the previous input image and the range of the group of pixels "Bpc" of the current input image. Compared to compressing the group of pixels, the residual data can be compressed into fewer bits. The residual data is compressed to generate compressed residual data. For example, the residual data may be compressed using differential pulse code modulation. A transform coding, quantization, and/or entropy coding may be performed on the residual data to generate the compressed residual data. The transform coding may be a discrete cosine transform. The entropy coding may be run-length coding and/or variable length coding. The motion estimation and compression process may be repeated for each group of pixels of the current input image.

Referring back to FIG. 2, each of the vector buffers 210, 212, and 214 is configured to buffer motion vectors. In particular, vector buffer A is configured to buffer a previously calculated vector field, which includes previously calculated motion vectors. During motion estimation, the previously calculated motion vectors are tested to select the best matching vector between each group of pixels of the current input image and a corresponding group of pixels of the previous input image. Vector buffer B is configured to store the best matching vector for each group of pixels of the current input image. Vector buffer C is configured to store the updated best matching vector for each group of pixels of the current input image.

The compressed image buffer "Ccurr1" 216 is configured to buffer the compressed residual data generated by the $1^{st}$ motion estimator 206 and the compressed image buffer "Ccurr2" 218 is configured to buffer the compressed residual data generated by the $2^{nd}$ motion estimator 208. Typically, the compressed image buffers are not located at the same integrated circuit as the motion estimators. However, as described below with reference to FIG. 7, in some embodiments, additional bandwidth savings may be achieved by locating the compressed image buffers on the same integrated circuit as the motion estimators.

The motion compensated temporal interpolator 220 is configured to decompress the compressed image using the motion vectors that result from motion estimation between the previous input image and the current input image and to reconstruct the current input image. The motion compensated temporal interpolator is also configured to perform motion compensated temporal interpolation on the previous input image and the current input image to generate at least one interpolated image. In particular, the motion compensated temporal interpolator is configured, for each group of pixels of the selected image, to decompress compressed residual data to generate reconstructed residual data, and to obtain a corresponding group of pixels of the reference image using the motion vector. The motion compensated temporal interpolator is also configured to add the reconstructed residual data to the corresponding group of pixels of the reference image or to subtract the reconstructed residual data from the corresponding group of pixels of the reference image. In the embodiment of FIG. 2, the decompression operation is performed within the motion compensated temporal interpolator by a decompression unit "DC" 228.

Figure 4:
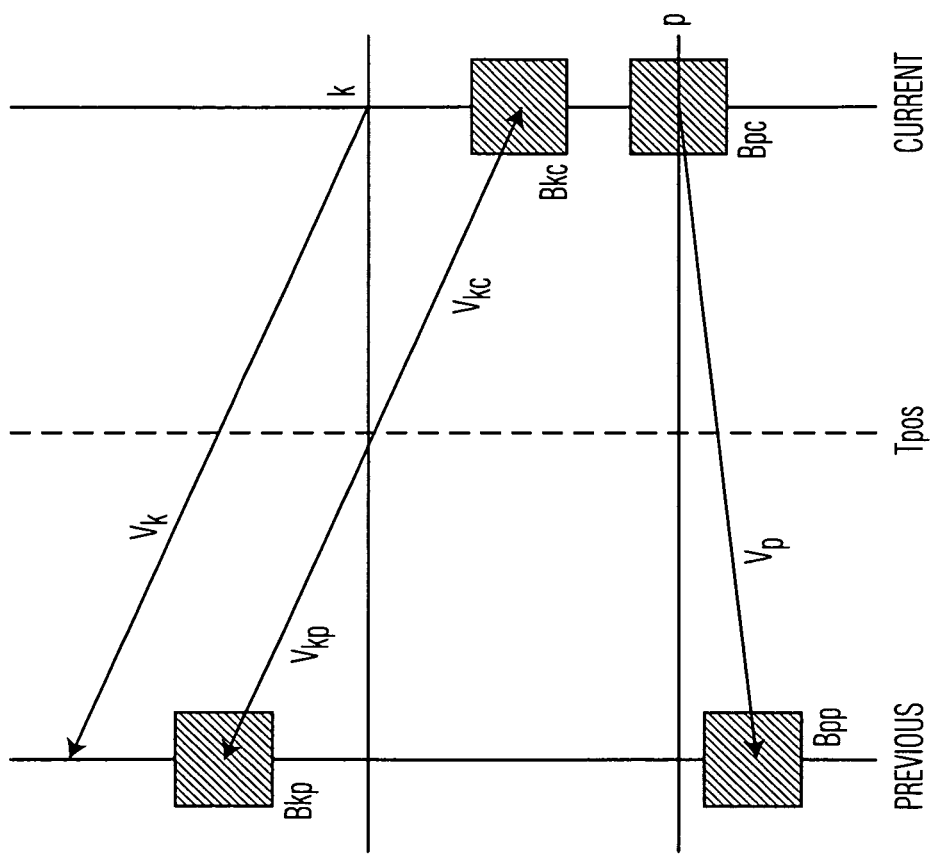
FIG. 4 illustrates a spatial-temporal view of a decompression process and a motion compensated temporal image interpolation process of the motion compensated temporal interpolator of FIG. 2.

FIG. 4 illustrates a spatial-temporal view of a decompression process and a motion compensated temporal image interpolation process of the motion compensated temporal interpolator 220 of FIG. 2. As shown in FIG. 4, a group of pixels "Bpc" of the current input image is reconstructed using a corresponding group of pixels "Bpp" of the previous input image and a motion vector "$v_p$" that is valid on position "p". The decompression process is repeated for each group of pixels of the current input image. After the required part of the current input image is decompressed, the motion compensated temporal image interpolation process begins. The decompression process and the motion compensated temporal image interpolation process are typically carried out in a pipelined or interleaved fashion. A new image is created at temporal position "Tpos" between the previous input image and the current input image. The motion compensated temporal interpolation is carried out at the current position "k," where the motion vector is "$v_k$." The motion vector "$v_k$" at the current position "k" is split into a "$v_{kp}$" part and a "$v_{kc}$" part. A group of pixels of the new image is constructed as follows. First, a group of pixels "Bkc" of the current input image and a group of pixels "Bkp" of the previous input image are fetched over the split parts "$v_{kp}$" and "$v_{kc}$" of the motion vector "$v_k$." Then, an interpolation algorithm is utilized to construct the group of pixels of the new image. The process of motion compensated temporal image interpolation is repeated for each group of pixels of the new image. The current image data that is accessed via vector "$v_{kc}$" must be available before the output image on a certain block position is created. Consequently, the decompression must run ahead of the image interpolation. The group of pixels "Bpc" of the current input image is reconstructed using the predictor data from the corresponding group of pixels "Bpp" of the previous input image, where the motion vector "$v_p$" that is available on position "p" is used.

Figure 5:
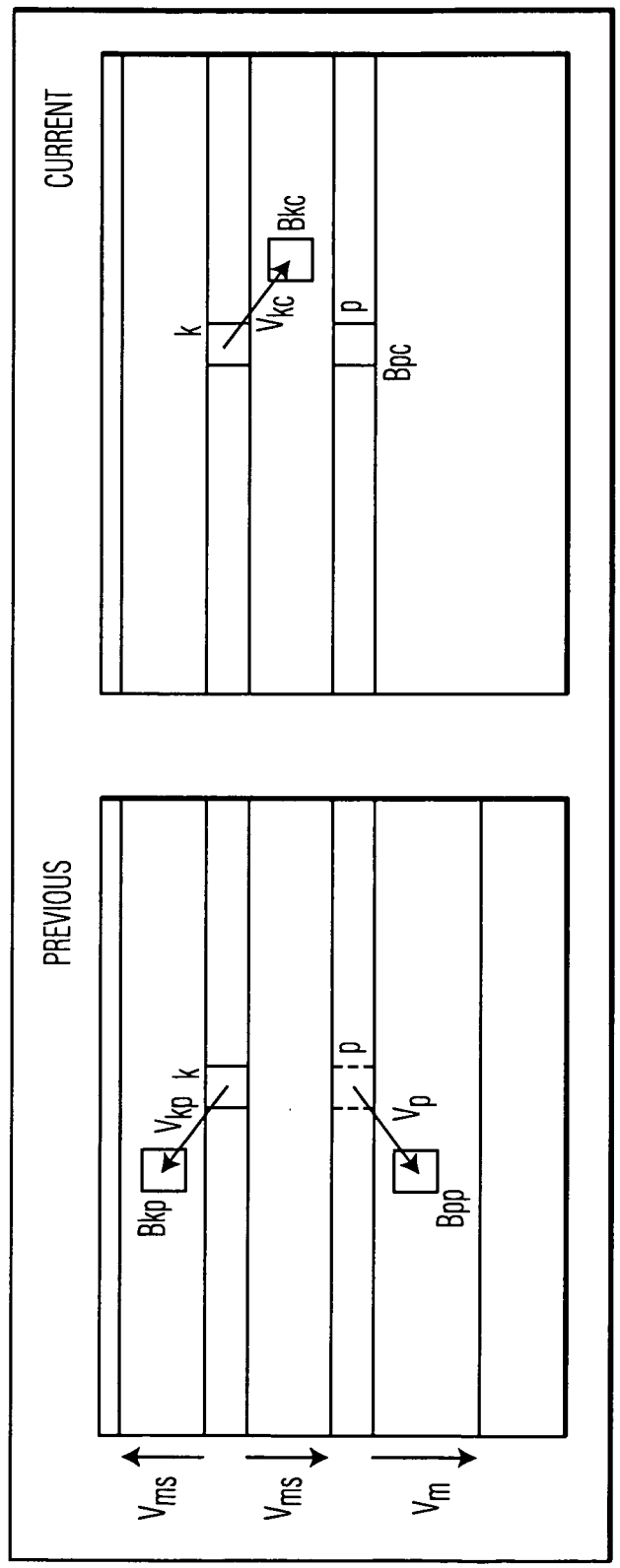
FIG. 5 illustrates a buffering scheme for the decompression process and the motion compensated temporal image interpolation process of FIG. 4.

FIG. 5 illustrates a buffering scheme for the decompression process and the motion compensated temporal image interpolation process of FIG. 4. The motion vectors can vary substantially, thus, the frame rate conversion system 200 may implement buffering in data caches or in dedicated memory buffers to assure that all image data within a search range is readily available. The frame rate conversion system scans a new image. FIG. 5 shows the required motion compensated data for a position "k" of the new image. The frame rate conversion system may buffer all data within the range of the maximum vertical component of the motion vector after vector splitting (Vms). For example, when the vector splitting is at the middle point of the motion vector, the value of the maximum vertical component of the motion vector for the previous input image after vector splitting is equal to the value of the maximum vertical component of the motion vector for the current input image after vector splitting. The motion compensated temporal image interpolation process begins after the decompression process of the current input image at position "p." The frame rate conversion system may buffer an image area "Vm" of the previous input image. The scanning direction of FIG. 5 is top-down. Because the group of pixels "Bpc" of the current input image may be located ahead of position "p," the data at position "p" must be in a search area. As a result, the search area is filled with data at position "p." Because the group of pixels "Bpc" of the current input image is compressed using the group of pixels "Bpp" of the previous input image, a vector access is required at position "p." FIG. 5 therefore illustrates two cost elements. The first element is that an extra access of image data over a motion vector is required. The second element is that the search area is enlarged to hold the image data required for the extra access.

Referring back to FIG. 2, the output image buffer 222 is configured to buffer the interpolated images generated by the motion compensated temporal interpolator 220. The output image buffer may be a memory circuit.

The video output processing unit "OUT" 224 is configured to process output video data. For example, the video output processing unit "OUT" may perform formatting on the output video data. The video output processing unit "OUT" may be implemented in active logic circuits. In some embodiments, the video output processing unit "OUT" is separated from the frame rate conversion system 200.

An example of the operation of the frame rate conversion system 200 of FIG. 2 is described as follows. At the video input processing unit "IN" 202, input video data is received, processed, and then transferred to the input image buffer. At the input image buffer 204, the input video data is buffered and a previous input image "Yprev" and a current input image "Ycurr" are reconstructed and transferred to the $1^{st}$ motion estimator 206. At the $1^{st}$ motion estimator, previously calculated motion vectors that are stored in vector buffer A 210 and newly calculated motion vectors on neighboring pixel blocks are used for each group of pixels of the current input image and a corresponding group of pixels of the previous input image and the current input image is compressed using the calculated motion vectors to generate a compressed image. At the compressed image buffer "Ccurr1" 216, the compressed image that is generated by the $1^{st}$ motion estimator is buffered. At vector buffer B 212, the best match motion vectors from the $1^{st}$ motion estimator are buffered. Vcurr1 is the output vector field of the $1^{st}$ motion estimator. At the $2^{nd}$ motion estimator 208, the compressed image buffered in the compressed image buffer "Ccurr1" is decompressed using the best match motion vectors buffered in vector buffer B to reconstruct the current input image, motion estimation is performed between the previous input image and the reconstructed current input image to generate improved motion vectors, and the reconstructed current input image is compressed using the improved motion vectors to generate a compressed image. At the compressed image buffer "Ccurr2" 218, the compressed image that is generated by the $2^{nd}$ motion estimator is buffered. At vector buffer C 214, the improved motion vectors from the $2^{nd}$ motion estimator is buffered. Vcurr2 is the output vector field of the $2^{nd}$ motion estimator. At the motion compensated temporal interpolator 220, the compressed image that is buffered in the compressed image buffer "Ccurr2" is decompressed using the motion vectors that are buffered in vector buffer C and the current input image is reconstructed. Motion compensated temporal interpolation is then performed between the previous input image and the reconstructed current input image to generate interpolated images. At the output image buffer 222, the interpolated images that are generated by the motion compensated temporal interpolator are buffered. At the video output processing unit "OUT" 224, the buffered interpolated images are processed and output.

By using the motion vectors that result from motion estimation to perform compression and decompression, image accesses are reduced, which results in bandwidth consumption savings. Examples of the bandwidth consumption savings by using the motion vectors that result from motion estimation to perform compression and decompression are described below.

In the embodiment of FIG. 2, the frame rate conversion system 200 handles a 60 Hz input signal in a 3:2 pull-down format. The original input source is a 24 Hz video signal. For every original input image, the frame rate conversion system outputs the original input image and four additional output images, which are generated from the original input image. The output signal is a 120 Hz progressive signal, which is five-fold of the original image rate.

An example of the bandwidth consumption of the frame rate conversion system 200 of FIG. 2 is as follows. In the following example, only the image luminance data, which is also referred to as "Y" data, is analyzed and the bandwidth of the input stage is not considered. FIG. 6 shows the exemplary properties of the input images. As shown in FIG. 6, the frame rate conversion system of FIG. 2 receives a standard high definition (HD) image luminance data, which has a width of 1920 pixels, a height of 1080 pixels, and a size of 2073600 Bytes. Vector data is stored in 32 bits storage. For each 8×8 pixel block, there is one vector data value. The frame rate conversion system only compresses the residual data and does not compress the location data or the vector data. Thus, the frame rate conversion system may achieve relatively large compression factors. On the other hand, the frame rate conversion system may implement relatively simple compression techniques to achieve a low cost, such as embedded in a system on chip (SoC). The compression factor is a trade-off between bandwidth consumption, image quality, and complexity of the compression logic. In the example of the bandwidth consumption of the frame rate conversion system, the compression factor is eight. FIG. 7 shows a bandwidth consumption of the frame rate conversion system of FIG. 2. As shown in FIG. 7, the bandwidth consumption of the frame rate conversion system of FIG. 2 is 687 megabyte/second. Under the same input images properties, the bandwidth consumption of a conventional frame rate conversion system without using the motion vectors that result from motion estimation to perform compression and decompression is 762 megabyte/second.

Figure 8:
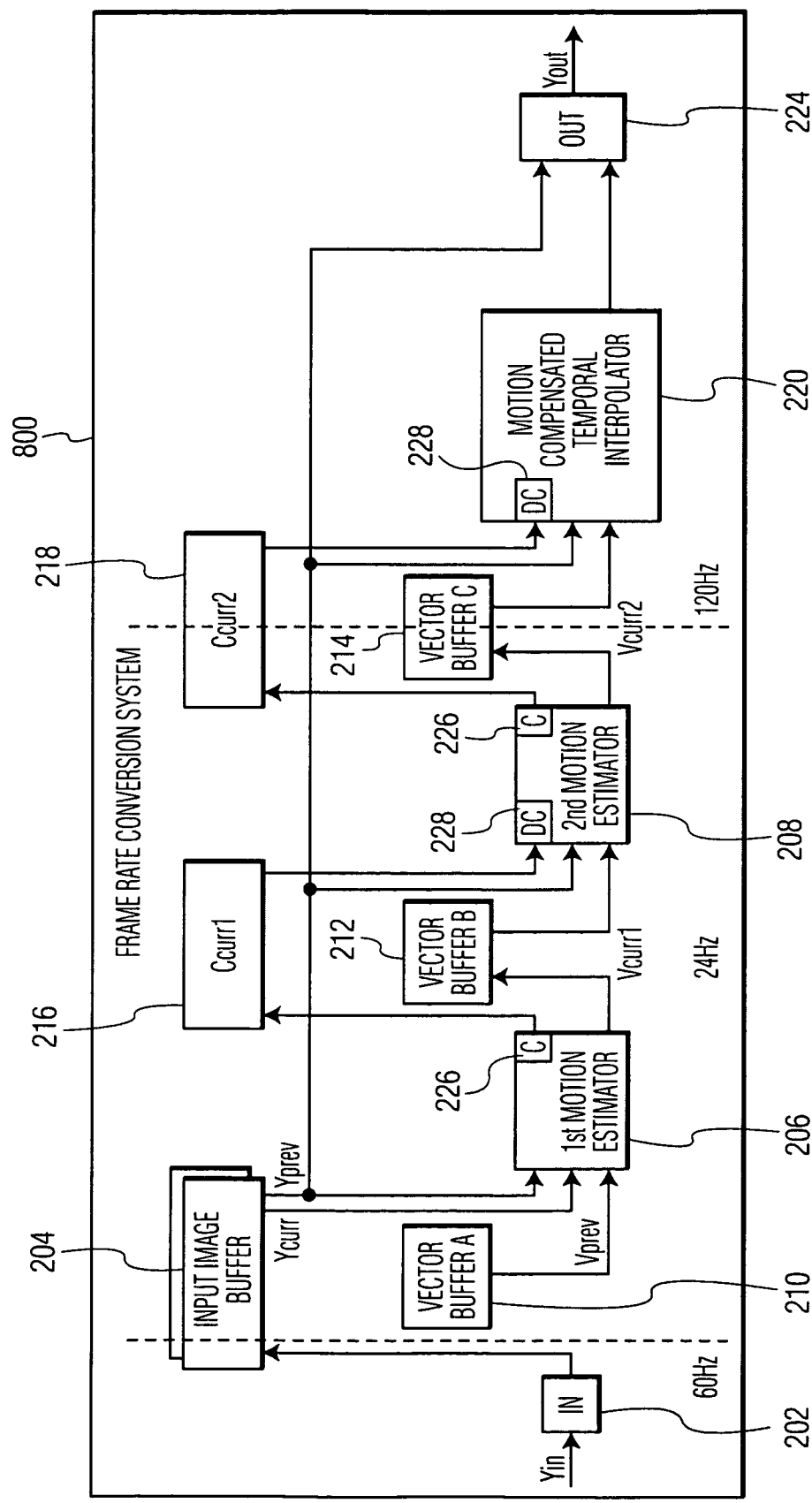
FIG. 8 depicts another embodiment of the frame rate conversion system of FIG. 1.

FIG. 8 depicts another embodiment of the frame rate conversion system 100 of FIG. 1. The primary difference between the frame rate conversion system 800 of FIG. 8 and the frame rate conversion system 200 of FIG. 2 is that the frame rate conversion system of FIG. 8 does not include the output image buffer 222 of FIG. 2 and the motion compensated temporal interpolator 220 is directly connected to the video output processing unit "OUT" 224. In an embodiment, the motion compensated temporal interpolator of FIG. 8 operates at the output image rate and video signals can be streamed directly from the motion compensated temporal interpolator into the video output processing unit "OUT."

An example of the bandwidth consumption of the frame rate conversion system 800 of FIG. 8 is as follows. The example of the bandwidth consumption implements the same input images properties and the same compression factor as the example of the bandwidth consumption described with reference to FIG. 2. In the example, for every original input image, four motion compensated temporal interpolation operations are required, where each operation requires reading two images, and the video output processing unit "OUT" reads one original input image, resulting in nine image transfers. FIG. 9 shows a bandwidth consumption of the frame rate conversion system of FIG. 8. As shown in FIG. 9, the bandwidth consumption of the frame rate conversion system of FIG. 8 is 467 megabyte/second.

Figure 10:
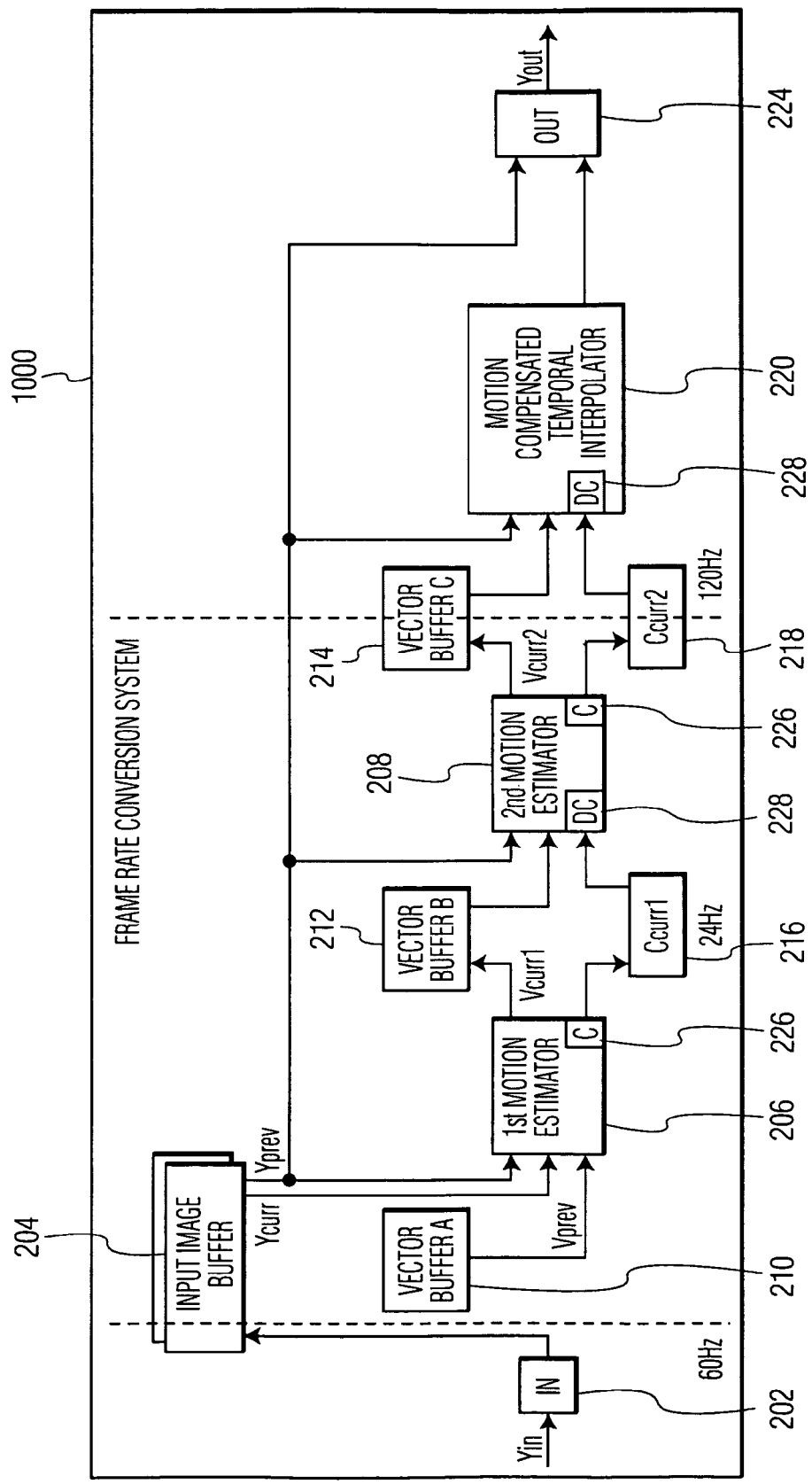
FIG. 10 depicts another embodiment of the frame rate conversion system of FIG. 1.

FIG. 10 depicts another embodiment of the frame rate conversion system 100 of FIG. 1. The primary difference between the frame rate conversion system 1000 of FIG. 10 and the frame rate conversion system 800 of FIG. 8 is that the compressed image buffers "Ccurr1" 216 and "Ccurr2" 218 and the $1^{st}$ and $2^{nd}$ motion estimators 206, 208 in the system of FIG. 10 are in one integrated circuit (not shown) such that accessing the compressed image does not consume bandwidth to external memory. For example, the compressed image buffers "Ccurr1" and "Ccurr2" may be on-chip local buffers or cache memory structures.

An example of the bandwidth consumption of the frame rate conversion system 1000 of FIG. 10 is as follows. The example of the bandwidth consumption implements the same input images properties and the same compression factor as the example of the bandwidth consumption described with reference to FIG. 2. In the example, accessing the compressed image does not consume bandwidth to external memory. FIG. 11 shows a bandwidth consumption of the frame rate conversion system of FIG. 10. As shown in FIG. 11, the bandwidth consumption of the frame rate conversion system of FIG. 10 is 423 megabyte/second.

Figure 12:
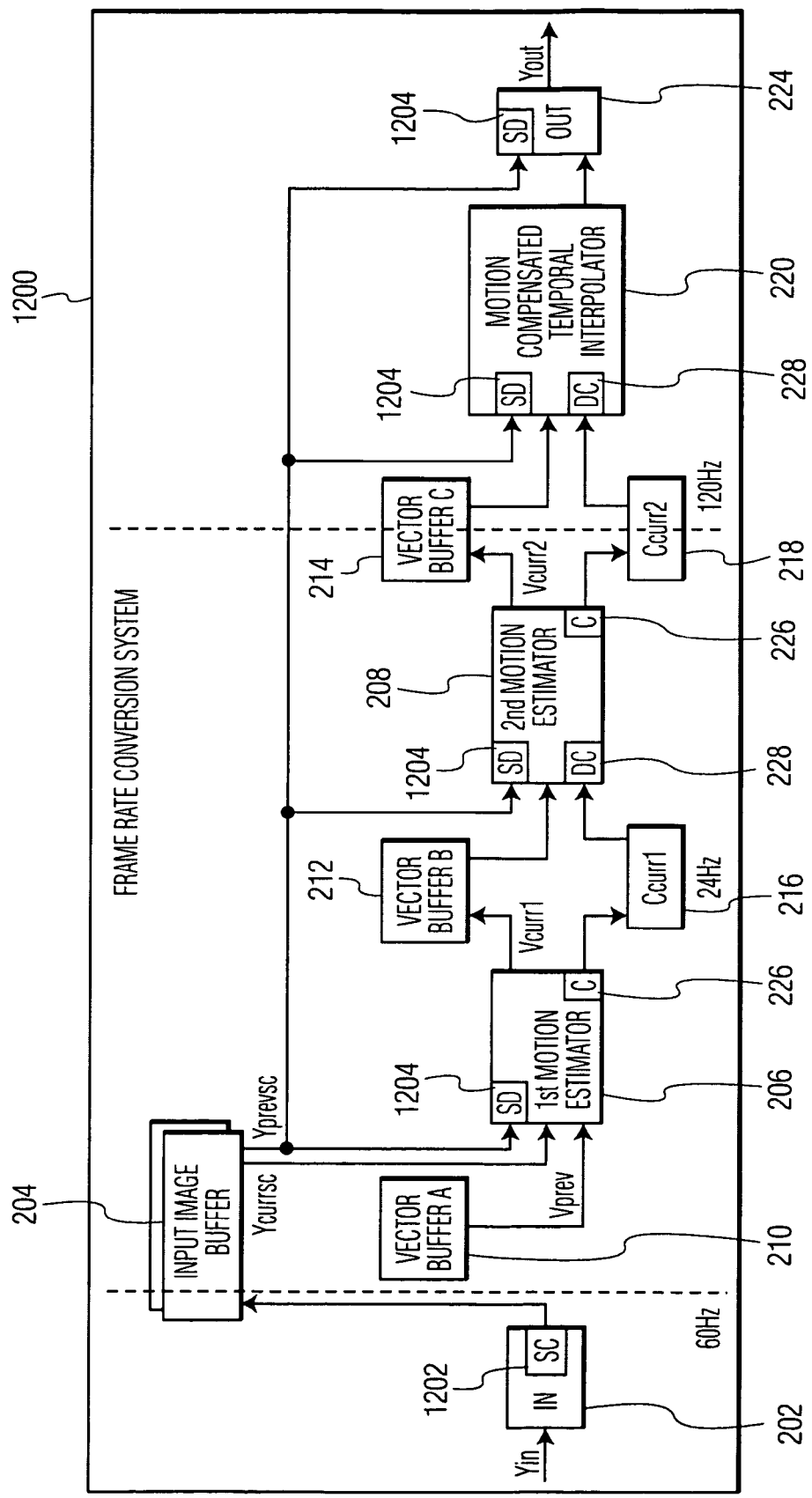
FIG. 12 depicts another embodiment of the frame rate conversion system of FIG. 1.

FIG. 12 depicts another embodiment of the frame rate conversion system 100 of FIG. 1. The primary difference between the frame rate conversion system 1200 of FIG. 12 and the frame rate conversion system 1000 of FIG. 10 is that the frame rate conversion system of FIG. 12 includes a spatial compression unit "SC" 1202 and a spatial decompression unit "SD" 1204. The spatial compression unit "SC" is configured to spatially compress the input images to generate a spatially compressed previous input image "Yprevsc" and a spatially compressed current input image "Ycurrsc." The spatial decompression unit "SD" is configured to spatially decompress the spatially compressed previous input image to reconstruct the previous input image. Additionally, the $1^{st}$ motion estimator 206 is further configured to spatially decompress the spatially compressed previous input image and the spatially compressed current input image to reconstruct the previous input image and the current input image, the $2^{nd}$ motion estimator 208 is further configured to spatially decompress the spatially compressed previous input image to reconstruct the previous input image, and the motion compensated temporal interpolator is further configured to spatially decompress the spatially compressed previous input image to reconstruct the previous input image. In the embodiment of FIG. 12, the spatial decompression operation is performed within the motion estimators by spatial decompression units "SD."

An example of the bandwidth consumption of the frame rate conversion system 1200 of FIG. 12 is as follows. This example of the bandwidth consumption of the frame rate conversion system implements the same input images properties and the same compression factor as the example of the bandwidth consumption described with reference to FIG. 2. In the example, the spatial compression unit "SC" 802 has a conservative compression ratio of 1.5. FIG. 13 shows a bandwidth consumption of the frame rate conversion system of FIG. 12. As shown in FIG. 13, the bandwidth consumption of the frame rate conversion system of FIG. 12 is 307 megabyte/second.

Figure 14:
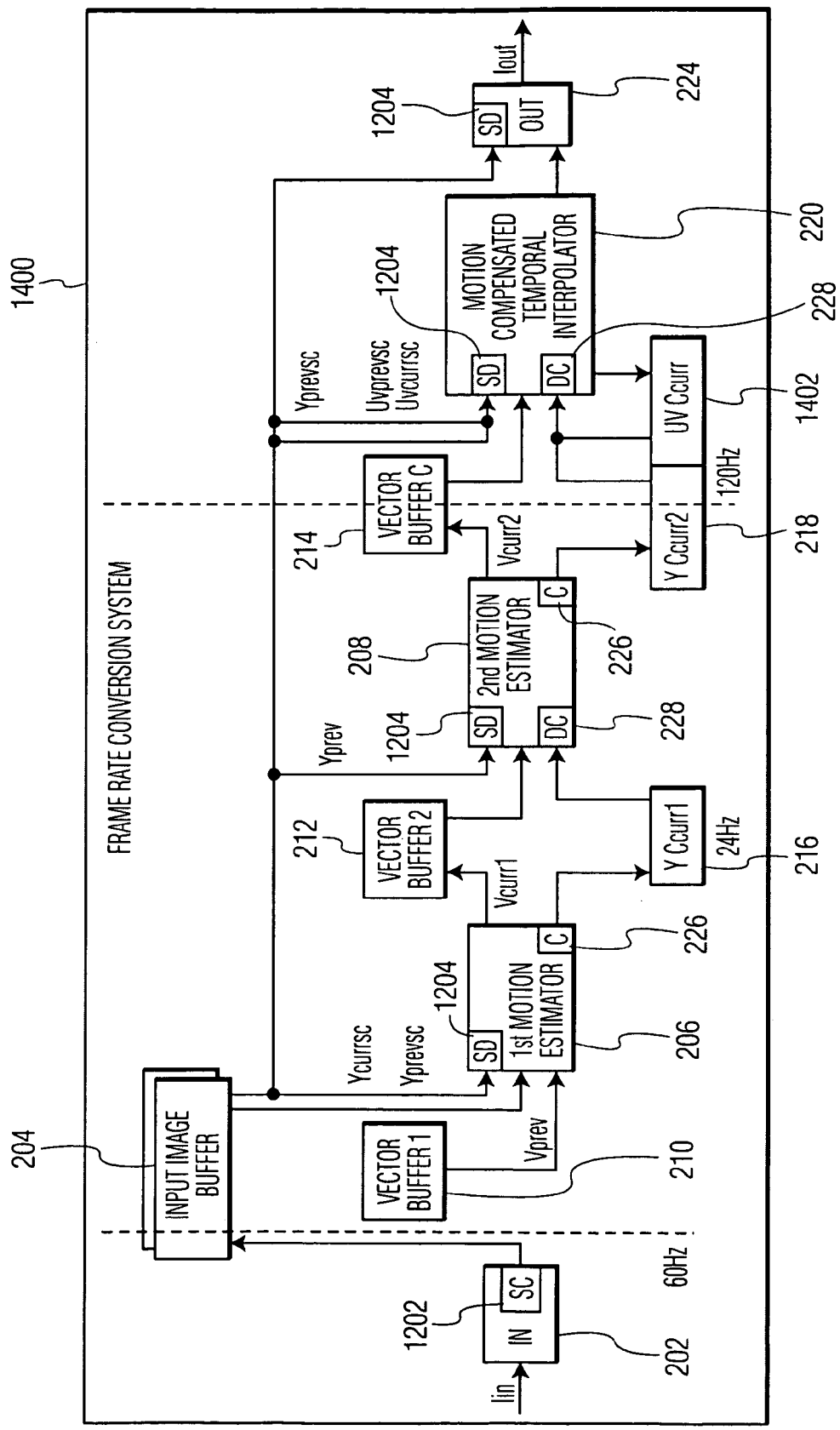
FIG. 14 depicts an embodiment of the frame rate conversion system of FIG. 1 that performs compression on the image luminance data and the image chrominance data.

The frame rate conversion systems 200, 800, 1000, and 1200 depicted in FIGS. 2, 8, 10, and 12 perform motion estimation on the image luminance data, which is also referred to as "Y" data. However, compression using the motion vectors generated in the motion estimation process can also be applied on the image chrominance data, which is also referred to as "UV" data. FIG. 14 depicts an embodiment of the frame rate conversion system 100 of FIG. 1 that performs compression on the image luminance data and the image chrominance data. The primary difference between the frame rate conversion system 1400 of FIG. 14 and the frame rate conversion system of FIG. 12 is that the frame rate conversion system of FIG. 14 performs compression on an image luminance component "Y" and two image chrominance components "U" and "V." In particular, the spatial compression unit "SC" 1202 is further configured to spatially compress the chrominance components of the previous input image and the chrominance components of the current input image to generate the compressed chrominance components "Uprevrsc" of the previous input image and the compressed chrominance components "Uvcurrsc" of the current input image. The motion compensated temporal interpolator 220 is further configured to spatially decompress the compressed chrominance components "Uprevrsc" of the previous input image and the compressed chrominance components "Uvcurrsc" of the current input image to reconstruct the chrominance components of the previous input image and the chrominance components of the current input image. In the embodiment of FIG. 14, the spatial decompression operation is performed within the motion compensated temporal interpolator by a spatial decompression unit "SD" 1204. The motion compensated temporal interpolator is also configured to perform compression on the chrominance components of the current input image using motion vectors buffered in vector buffer C 214 and the chrominance components of the previous input image to generate the compressed image chrominance components. An on-chip compressed image chrominance components buffer "UVCcurr" 1402 buffers the compressed image chrominance components. When the chrominance components of the current input image are needed, the motion compensated temporal interpolator decompresses the compressed image chrominance components for the image interpolation.

Although the frame rate conversion systems 200, 800, 1000, 1200, and 1400 depicted in FIGS. 2, 8, 10, 12, and 14 perform compression on the current input image of an image pair that includes the previous input image and the current input image, other embodiments of the frame rate conversion system may perform compression on the previous input image of the image pair. One advantage of performing compression on the previous input image is reduced signal latency, which can improve audio-video synchronization and game responsiveness. For example, an exemplary embodiment of the frame rate conversion system may be configured to perform motion compensated image temporal interpolation on the previous input image and the current input image to generate four interpolated images. The frame rate conversion system may output one of the previous input image and the current input image and the four interpolated images. To avoid an extra decompression operation, when the current input image is compressed, the frame rate conversion system outputs the previous input image and the four interpolated images and when the previous input image is compressed, the four interpolated images and the current input image are output. Thus, compared to performing compression on the current input image, performing compression on the previous input image reduces the signal latency of one image processed at output rate.

FIG. 15 is a process flow diagram of a method for frame rate conversion that utilizes motion estimation and motion compensated temporal interpolation in accordance with an embodiment of the invention. At block 1500, a first image and a second image are obtained, where the first and second images correspond to different instances in time. At block 1502, the second image is compressed using multiple motion vectors that result from motion estimation between the first image and the second image to generate a compressed image. At block 1504, an interpolated image is generated using the compressed image.

The various components or units of the embodiments that have been described or depicted may be implemented in software, hardware, firmware, or a combination of software, hardware, and firmware.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention that have been described or depicted include several components described or depicted herein, other embodiments of the invention may include fewer or more components to implement less or more functionality.

Although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method of generating interpolated images, the method comprising:
obtaining at a compression unit a first image and a second image, wherein the first and second images correspond to different instances in time;
compressing the second image with the compression unit using a plurality of motion vectors that result from motion estimation between the first image and the second image to generate a compressed image;
decompressing at least a part of the compressed image, and generating an interpolated image using the decompressed image;
wherein the interpolated image is generated after the compressed image has been decompressed and before an output image is decoded, without using the reconstructed image.

2. The method of claim 1, wherein compressing the second image includes, for each group of pixels of the second image, obtaining a corresponding group of pixels of the first image using a motion vector from the plurality of motion vectors, processing the group of pixels of the second image and the corresponding group of pixels of the first image to generate residual data, and compressing the residual data to generate compressed residual data.

3. The method of claim 2, wherein processing the group of pixels of the second image and the corresponding group of pixels of the first image includes one of subtracting the corresponding group of pixels of the first image from the group of pixels of the second image and subtracting the group of pixels of the second image from the corresponding group of pixels of the first image.

4. The method of claim 2 further comprising buffering the compressed residual data within an integrated circuit while compressing the second image within the integrated circuit.

5. The method of claim 2, wherein compressing the residual data includes performing differential pulse code modulation on the residual data.

6. The method of claim 2, wherein compressing the residual data includes performing a transform coding, quantization, and entropy coding on the residual data.

7. The method of claim 1, wherein decompressing at least a part of the compressed image includes, for groups of pixels of the second image, decompressing compressed residual data to generate reconstructed residual data, obtaining a corresponding group of pixels of the first image using at least one of the motion vectors, and processing the reconstructed residual data and the corresponding group of pixels of the first image to generate a group of pixels of the second image.

8. The method of claim 7, wherein processing the reconstructed residual data and the corresponding group of pixels of the first image to generate the group of pixels of the second image includes one of adding the reconstructed residual data to the corresponding group of pixels of the first image and subtracting the reconstructed residual data from the corresponding group of pixels of the first image.

9. The method of claim 1 further comprising spatially compressing at least one of the first and second images to generate a spatially compressed image and spatially decompressing the spatially compressed image to reconstruct the at least one of the first and second images.

10. A system for frame rate conversion, comprising:
a compression unit configured to compress a second image using a plurality of motion vectors that result from motion estimation between a first image and the second image to generate a compressed image, wherein the first and second images correspond to different instances in time; and
an interpolator after the compressor and before an output decoder to generate an interpolated image using the compressed image without using a reconstructed image.

11. The system of claim 10, wherein the compression unit is configured, for each group of pixels of the second image, to obtain a corresponding group of pixels of the first image using a motion vector from the plurality of motion vectors, to subtract the corresponding group of pixels of the first image from the group of pixels of the second image or subtract the group of pixels of the second image from the corresponding group of pixels of the first image to generate residual data, and to compress the residual data to generate compressed residual data.

12. The system of claim 11 further comprising a buffer unit configured to buffer the compressed residual data within an integrated circuit, wherein the compression unit is within the integrated circuit.

13. The system of claim 11, wherein the compression unit is configured to perform differential pulse code modulation on the residual data.

14. The system of claim 11, wherein the compression unit is configured to perform a transform coding, quantization, and entropy coding on the residual data.

15. The system of claim 10 further comprising a decompression unit configured to decompress the compressed image using the plurality of motion vectors to reconstruct the second image.

16. A system for frame rate conversion comprising:
a motion estimator configured to perform motion estimation between a first image and a second image to generate a plurality of motion vectors;
a compression unit to compress the second image using the plurality of motion vectors to generate a compressed image, wherein the first and second images correspond to different instances in time; and
motion compensated temporal interpolator after the compression unit and before an output decoder, the motion compensated temporal interpolator being configured to decompress the compressed image using the plurality of motion vectors, without using a reconstructed image, to reconstruct the second image and to perform motion compensated temporal interpolation on the first and second images to generate an interpolated image.

17. The system of claim 16, wherein the motion estimator is configured, for each group of pixels of the second image, to obtain a corresponding group of pixels of the first image using a motion vector from the plurality of motion vectors, to subtract the corresponding group of pixels of the first image from the group of pixels of the second image or subtract the group of pixels of the second image from the corresponding group of pixels of the first image to generate residual data, and wherein the compressor unit compresses the residual data to generate compressed residual data.

18. the system of claim 16, wherein the motion compensated temporal interpolator is configured, for each group of pixels of the second image, to decompress compressed residual data to generate reconstructed residual data, to obtain a corresponding group of pixels of the first image using the motion vector, to add the reconstructed residual data to the corresponding group of pixels of the first image or to subtract the reconstructed residual data from the corresponding group of pixels of the first image.

19. The system of claim 16 wherein the compression unit is a spatial compression unit configured to spatially compress at least one of the first and second images to generate a spatially compressed image, and the motion compensated temporal interpolator comprises a spatial decompression unit configured to spatially decompress the spatially compressed image to reconstruct the at least one of the first and second images.

* * * * *